US009146915B2

(12) United States Patent
He et al.

(10) Patent No.: US 9,146,915 B2
(45) Date of Patent: Sep. 29, 2015

(54) METHOD, APPARATUS, AND COMPUTER STORAGE MEDIUM FOR AUTOMATICALLY ADDING TAGS TO DOCUMENT

(71) Applicant: Tencent Technology (Shenzhen) Company Limited, Shenzhen (CN)

(72) Inventors: Xiang He, Shenzhen (CN); Ye Wang, Shenzhen (CN); Feng Jiao, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 0 days.

(21) Appl. No.: 14/370,418

(22) PCT Filed: Dec. 17, 2012

(86) PCT No.: PCT/CN2012/086733
§ 371 (c)(1),
(2) Date: Jul. 2, 2014

(87) PCT Pub. No.: WO2013/102396
PCT Pub. Date: Jul. 11, 2013

(65) Prior Publication Data
US 2015/0019951 A1    Jan. 15, 2015

(30) Foreign Application Priority Data
Jan. 5, 2012    (CN) .......................... 2012 1 0001611

(51) Int. Cl.
*G06F 17/00* (2006.01)
*G06F 17/24* (2006.01)
*G06F 17/27* (2006.01)

(52) U.S. Cl.
CPC ............ *G06F 17/241* (2013.01); *G06F 17/277* (2013.01); *G06F 17/2735* (2013.01); *G06F 17/2785* (2013.01)

(58) Field of Classification Search
CPC ............ G06F 17/30616; G06F 17/241; G06F 17/2247; G06F 17/2785; G06F 17/277; G06F 17/2735; G06Q 10/10
See application file for complete search history.

(56) References Cited

U.S. PATENT DOCUMENTS 5,424,947 A  *  6/1995  Nagao et al. ....................... 704/9
5,642,518 A  *  6/1997  Kiyama et al. .................... 704/7

(Continued)

FOREIGN PATENT DOCUMENTS

CN    101408885    4/2009
CN    102081642    6/2011

(Continued)

OTHER PUBLICATIONS

Qian, Y. et al.,"Combination Entropy and Combination Granulation in Incomplete Information System," RSKT 2006, LNAI 4062, © 2006, Springer-Verlag Berlin Heidelberg, pp. 184-190.*

(Continued)

*Primary Examiner* — Cesar Paula
*Assistant Examiner* — James H Blackwell
(74) *Attorney, Agent, or Firm* — Brinks Gilson & Lione

(57) ABSTRACT

A method and apparatus for automatically adding a tag to a document are provided. The method comprises: determining a plurality of candidate tag words corresponding to the document; determining a corpus comprising a plurality of texts; selecting commonly-used words from the corpus as characteristic words; determining, for each of the characteristic words and each of the candidate tag words, a probability for co-occurrence of the candidate tag word with the characteristic word; abstracting characteristic words from the document, and calculating a weight for each of the abstracted characteristic words; and calculating, in the corpus, a weighted probability for co-occurrence of each of the candidate tag words with all of the characteristic words abstracted from the document; selecting the candidate tag word with a high weighted co-occurrence probability as a tag word to be added to the document.

18 Claims, 2 Drawing Sheets

(56) References Cited

U.S. PATENT DOCUMENTS

| | | | |
|---|---|---|---|
| 5,675,819 A * | 10/1997 | Schuetze | 704/10 |
| 6,064,952 A * | 5/2000 | Imanaka et al. | 704/9 |
| 6,317,740 B1 * | 11/2001 | Mukherjea et al. | 707/758 |
| 6,480,841 B1 * | 11/2002 | Higashio et al. | 1/1 |
| 7,333,984 B2 * | 2/2008 | Oosta | 707/750 |
| 7,367,043 B2 * | 4/2008 | Dudkiewicz et al. | 725/138 |
| 7,395,256 B2 * | 7/2008 | Ji et al. | 707/737 |
| 7,593,932 B2 * | 9/2009 | Lindh et al. | 1/1 |
| 7,627,559 B2 * | 12/2009 | Srivastava et al. | 1/1 |
| 7,711,737 B2 * | 5/2010 | Surendran | 707/748 |
| 7,856,435 B2 * | 12/2010 | Nanavati et al. | 707/722 |
| 7,996,393 B1 * | 8/2011 | Nanno et al. | 707/723 |
| 8,055,688 B2 * | 11/2011 | Giblin | 707/804 |
| 8,073,850 B1 * | 12/2011 | Hubbard et al. | 707/736 |
| 8,090,724 B1 * | 1/2012 | Welch et al. | 707/750 |
| 8,166,051 B1 * | 4/2012 | Bauer et al. | 707/750 |
| 8,266,228 B2 * | 9/2012 | Amsterdam et al. | 709/206 |
| 8,280,886 B2 * | 10/2012 | Labrou et al. | 707/737 |
| 8,375,022 B2 * | 2/2013 | Balinsky et al. | 707/713 |
| 8,463,598 B2 * | 6/2013 | Wu et al. | 704/10 |
| 8,463,786 B2 * | 6/2013 | Udupa et al. | 707/737 |
| 8,606,795 B2 * | 12/2013 | Morgana et al. | 707/750 |
| 8,856,145 B2 * | 10/2014 | Parikh et al. | 707/750 |
| 8,874,568 B2 * | 10/2014 | Stankiewicz et al. | 707/728 |
| 2005/0165736 A1 * | 7/2005 | Oosta | 707/2 |
| 2006/0085405 A1 * | 4/2006 | Hsu et al. | 707/3 |
| 2008/0195595 A1 * | 8/2008 | Masuyama et al. | 707/5 |
| 2009/0094233 A1 * | 4/2009 | Marvit et al. | 707/5 |
| 2009/0204609 A1 * | 8/2009 | Labrou et al. | 707/5 |
| 2009/0254540 A1 * | 10/2009 | Musgrove et al. | 707/5 |
| 2009/0299998 A1 * | 12/2009 | Kim | 707/5 |
| 2010/0005083 A1 * | 1/2010 | Morgana et al. | 707/5 |
| 2010/0076976 A1 * | 3/2010 | Sotirov et al. | 707/737 |
| 2011/0004465 A1 * | 1/2011 | Rose et al. | 704/9 |
| 2011/0035350 A1 | 2/2011 | Zwol et al. | |
| 2011/0060983 A1 * | 3/2011 | Cai et al. | 715/254 |
| 2011/0137999 A1 * | 6/2011 | Amsterdam et al. | 709/206 |
| 2011/0231411 A1 * | 9/2011 | Shein et al. | 707/749 |
| 2011/0307485 A1 * | 12/2011 | Udupa et al. | 707/737 |
| 2012/0226696 A1 * | 9/2012 | Thambiratnam et al. | 707/738 |
| 2013/0036076 A1 * | 2/2013 | Yang et al. | 706/12 |
| 2013/0132364 A1 * | 5/2013 | Udupa et al. | 707/709 |

FOREIGN PATENT DOCUMENTS

| | | |
|---|---|---|
| JP | 2003067412 | 3/2003 |
| JP | 2006323517 | 11/2006 |
| JP | 2009015743 | 1/2009 |
| JP | 2010224622 | 7/2010 |
| KR | 10-2009-0045520 | 5/2009 |
| KR | 10-1011726 | 1/2011 |

OTHER PUBLICATIONS

Fautsch, C. et al., "Comparison Between Manually and Automatically Assigned Descriptors Based on a German Bibleiographic Collection," © 2009, IEEE, pp. 378-382.*

Wartena, C. et al., "Keyword Extraction using Word Co-occurrence," © 2010 IEEE, pp. 54-58.*

Panunzi, A. et al., "Keyword Extraction in Open-Domain Multilingual Textual Resources," © 2005, IEEE, 4 pages.*

Wan, X. et al., "Single Document Keyphrase Extraction Using Neighborhood Knowledge," © 2008, AAAI, pp. 855-860.*

Matsuo, Y. et al., "Keyword Extraction from a Single Document using Word Co-occurrence Statistical Information," © 2003, AAAI, pp. 392-396.*

Frank, E. et al., "Domain-Specifc Keyphrase Extraction," © 1999, in Proc. 16th Intl. Joint Conf. on Artificial Intelligence, Morgan Kaufmann Publishers, pp. 668-673.*

International Search Report, International Application No. PCT/CN2012/086733, Mar. 28, 2013, 6 pages.

Office Action dated Aug. 25, 2014 from Korean Counterpart Application No. 10-2014-7019605, including an English translation.

Office Action issued in related case JP-2014-550620, dated Dec. 9, 2014, pp. 1-4.

Office Action dated Jul. 23, 2015 from European Counterpart Application No. 12864434.1.

\* cited by examiner

METHOD, APPARATUS, AND COMPUTER STORAGE MEDIUM FOR AUTOMATICALLY ADDING TAGS TO DOCUMENT

The present application is the national phase of International Application No. PCT/CN2012/086733, entitled "METHOD, APPARATUS, AND COMPUTER STORAGE MEDIUM FOR AUTOMATICALLY ADDING TAGS TO DOCUMENT", filed on Dec. 17, 2012, which claims priority to Chinese patent application No. 201210001611.9 titled "METHOD AND APPARATUS FOR AUTOMATICALLY ADDING TAG TO DOCUMENT" and filed with the State Intellectual Property Office on Jan. 5, 2012, both of which are incorporated herein by reference in their entireties.

FIELD

The present disclosure relates to the technology of Internet document, and in particular to a method and an apparatus for automatically adding a tag to a document.

BACKGROUND

Tags, which are used for organizing contents on the Internet, are key words that are highly relevant to a document. The contents of the document may be briefly described and classified by tags to facilitate retrieval and sharing.

At present, there are mainly three manners for adding a tag to a document: 1) a manner of manual tag, in which a specific tag is designated to the document manually; 2) a manner of key word tag, in which an important key word that is automatically abstracted from the document by analyzing the contents of the document is taken as a tag; and 3) a manner of socialized tag, in which a tag is added to a user's document by the user himself. There are problems in all of the three manners, for example, as to 1) the manner of manual tag, tags cannot be added to a large amount of documents automatically; as to 2) the manner of key word tag, only a key word occurring in the document may be chosen as a tag, whereas not all of the key words are suitable to be a tag; and as to 3) the manners of socialized tag, it requires a user to add tags to the document by himself, resulting in disordered tags due to inconsistent standards of different users.

SUMMARY

According to an embodiment of the disclosure, there are provided a method and an apparatus for automatically adding a tag to a document, by which a tag, not limited to a key word in the document, may be added to a document intelligently.

The solution of an embodiment of the disclosure is implemented as follows.

A method for automatically adding a tag to a document includes:

determining multiple candidate tag words corresponding to the document;

determining a corpus including multiple texts; selecting commonly-used words from the corpus as characteristic words; determining, for each of the characteristic words and each of the candidate tag words, a probability for co-occurrence of the candidate tag word with the characteristic word;

abstracting the characteristic words from the document, and calculating a weight for each of the abstracted characteristic words; and calculating, in the corpus, a weighted probability for co-occurrence of each of the candidate tag words with all of the characteristic words abstracted from the document; selecting the candidate tag word with a high weighted co-occurrence probability as a tag word to be added to the document.

An apparatus for automatically adding a tag to a document includes:

a candidate tag word determining module, configured to determine multiple candidate tag words corresponding to the document;

a co-occurrence probability determining module, configured to determine a corpus including multiple texts, select commonly-used words from the corpus as characteristic words, and determine, for each of the characteristic words and each of the candidate tag words, a probability for co-occurrence of the candidate tag word with the characteristic word;

a weight calculating module, configured to abstract characteristic words from the document, and calculate a weight for each of the abstracted characteristic word;

a weighted co-occurrence probability calculating module, configured to calculate, in the corpus, a weighted probability for co-occurrence of each of the candidate tag words with all of the characteristic words abstracted from the document; and a tag word adding module, configured to select the candidate tag word with a high weighted co-occurrence probability as a tag word to be added to the document.

In the method and the apparatus for automatically adding a tag to a document according to an embodiment of the disclosure, a tag, not limited to a key word in the document, may be added to a document intelligently by calculating the probability for co-occurrence of a characteristic word with a candidate tag word in the corpus, converting the co-occurrence probability into a vote from the characteristic word to the candidate tag word and taking the candidate tag word that obtains the most votes as the tag word to be added to the document.

DETAILED DESCRIPTION

Figure 1:
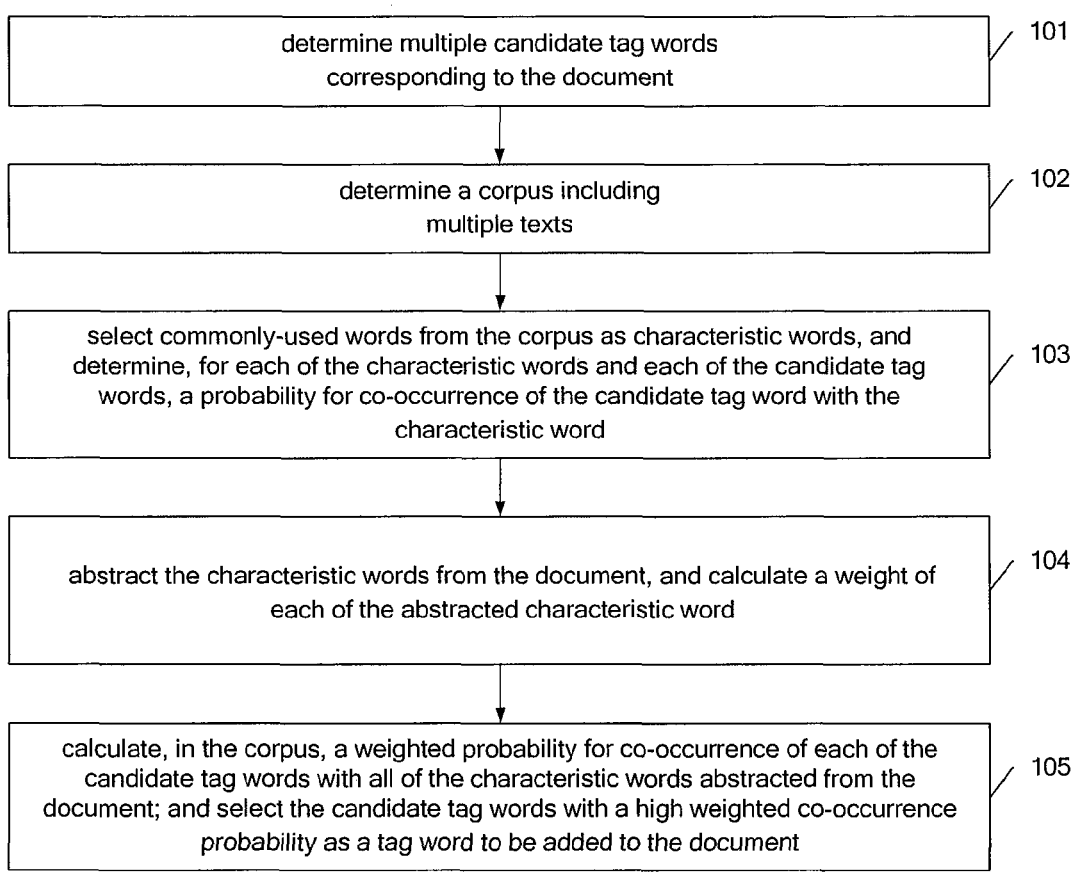
FIG. 1 is a flowchart of a method for automatically adding a tag to a document according to an embodiment of the disclosure.

According to an embodiment of the disclosure, there is provided a method for automatically adding a tag to a document. FIG. 1 is a flowchart of the method, which includes the steps as follows.

In Step 101, multiple candidate tag words corresponding to the document are determined.

In this Step, the multiple candidate tag words corresponding to the document may be determined by, but not limited to, three manners as follows:

1) a manner of manual tag, in which a specific tag is specified to the document manually;

2) a manner of key word tag, in which an important key word that is automatically abstracted from the document by analyzing the contents of the document is taken as the tag; and 3) a manner of socialized tag, in which tags are add to a user's document by the user himself.

The candidate tag words are not limited to the words occurring in the document in the case that the candidate tag words are determined by the manner of manual tag or the manner of socialized tag.

In Step 102, a corpus including multiple texts is determined.

For example, if one million texts are obtained from the Internet, the one million obtained texts are collectively referred to as a corpus.

In Step 103, commonly-used words are selected from the corpus as characteristic words, and for each of the characteristic words and each of the candidate tag words, a probability for the co-occurrence of the candidate tag word with the characteristic word is determined in the corpus.

In Step 104, the characteristic words are abstracted from the document, and, a weight for each of the characteristic words is calculated.

In Step 105, for each of the candidate tag words, a weighted probability for the co-occurrence of the candidate tag word with all of the characteristic words occurring in the document is calculated in the corpus; and a candidate tag word with a high weighted co-occurrence probability is selected as a tag word to be added to the document.

In the Step 103, the co-occurrence probability is denoted as P(X|Y), where, X denotes one of the candidate tag words and Y denotes one of the characteristic words that occurs in the corpus. P(X|Y) may be determined by various ways as follows.

In a first way, P(X|Y) equals to a result of dividing the number of times for the co-occurrence of X and Y in the same text included in the corpus by the number of times for the occurrence of Y in the corpus.

In a second way, $$P(X \mid Y) = \frac{H(X, Y)}{I(X, Y)} = \frac{H(X, Y)}{H(X) + H(Y) - H(X, Y)},$$

where H(X,Y) denotes a combination entropy of X and Y, I(X,Y) denotes mutual information of X and Y, H(X) denotes an information entropy of X, and H(Y) denotes an information entropy of Y.

In a third way, P(X|Y) is determined by using a lexical database such as the wordnet.

In the Step 104, for each of the abstracted characteristic words, a weight for the characteristic word may be calculated based on the number of times that the characteristic word occurs in the document and the number of the texts in the corpus in which the characteristic word occurs.

The weight for the characteristic word Y abstracted in the document is denoted as $W_Y$, and $W_Y$ may be calculated by: $W_Y$ is equal to the product of the number of times that Y occurs in the document and the number of the texts in the corpus in which Y occurs.

In the Step 105, the weighted co-occurrence probability is denoted as $$P_X = \sum_{i=1}^{n} P(X \mid Y_i) \times W_{Y_i},$$

where $Y_i$ denotes one of the characteristic words abstracted from the document, $W_{Y_i}$ denotes the weight for $Y_i$, and n denotes the number of the characteristic words abstracted from the document.

In the Step 105, the weighted co-occurrence probability $P_X$ may only be calculated for the candidate tag word that co-occurs with more than one characteristic word abstracted from the document, rather than for all the candidate tag words.

Specific embodiments will be introduced below in detail.

First Embodiment

In step 1, a tag word set is prepared.

Multiple candidate tag words corresponding to the document are acquired to constitute a tag word set as desired. For example, the tag word set may include tag words such as the type of the movie and the celebrity, in the case that it is required to add tags to documents in connection with movies.

In step 2, a corpus is prepared.

Multiple related texts may be collected from the Internet as a corpus to be used in the statistics of the co-occurrence relationships between words.

In step 3, characteristic words are abstracted from the corpus.

A word-segmentation is performed on the texts in the corpus. Then the term frequency (TF) of each word is counted. High-frequency words, non-use words and low-frequency words are removed, and the rest commonly-used words are selected as the characteristic words.

In step 4, the co-occurrence probability P(X|Y) of each of the characteristic word with each of the candidate tag word is calculated.

P(X|Y) equals to a result of dividing the number of times for the co-occurrence of X and Y in the same text included in the corpus by the number of times for the occurrence of Y in the corpus.

Where, X denotes one of the candidate tag words, and Y denotes one of the characteristic words.

In step 5, tag words are added automatically to the document, the specific steps of which are as follows:

step I, performing a word segmentation on the document;

step II, abstracting all the of the characteristic words that occur in the document according to the word segmentation result, and calculating the weight $W_Y$ for each abstracted characteristic word Y as $W_Y$=TF×IDF, where TF denotes the number of times that Y occurs in the document and IDF denotes the number of the texts in the corpus in which Y occurs;

step III, abstracting candidate tag words which co-occurs (i.e., the co-occurrence probability is not 0) with at least one characteristic word based on the co-occurrence probability calculated in step 4;

step IV, calculating, for each of the abstracted candidate tag words, the weighted co-occurrence probability $$P_X = \sum_{i=1}^{n} P(X \mid Y_i) \times W_{Y_i}$$

of the abstracted candidate tag word with all of the characteristic words abstracted from the document, where, $Y_i$ denotes one of the characteristic words abstracted from the document, $W_{Y_i}$ denotes the weight for $Y_i$, and n denotes the number of the characteristic words abstracted from the document; and step V, ranking all of the abstracted candidate tag words in a descending order of $P_X$ values, and selecting one or more candidate tag words having the highest $P_X$ as the tag word words to be added to the document.

In this step, a few of candidate tag words are abstracted in the step III firstly, and then the weighted co-occurrence probability is calculated for each of these abstracted candidate tag words. This is to speed up the calculation and to save the system resource. According to other embodiments of the disclosure, the weighted co-occurrence probability may be calculated for all of the candidate tag words. For a candidate tag word which does not have a co-occurrence relationship with any of the characteristic words, the calculated weighted co-occurrence probability $P_X=0$ and the candidate tag word will be ranked at the end of the queue of candidate tag words in the step V.

In another embodiment of the disclosure, the co-occurrence probability P(X|Y) of the characteristic word and the candidate tag word may be calculated by other ways. For example, P(X|Y) may be calculated as $$P(X\mid Y) = \frac{H(X,Y)}{I(X,Y)} = \frac{H(X,Y)}{H(X)+H(Y)-H(X,Y)},$$

where H(X,Y) denotes a combination entropy of X and Y, I(X,Y) denotes mutual information of X and Y, H(X) denotes an information entropy of X and H(Y) denotes an information entropy of Y. Alternatively, the relationship between the characteristic word and the candidate tag word may be determined by using a lexical database such as the wordnet.

Figure 2:
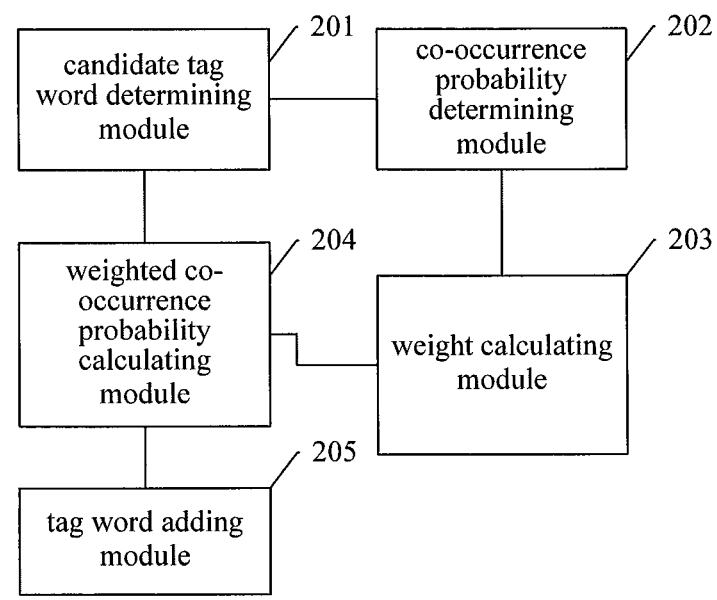
FIG. 2 is a schematic diagram of the structure of an apparatus for automatically adding a tag to a document according to an embodiment of the disclosure.

According to an embodiment of the disclosure, it is further provided an apparatus for automatically adding a tag to a document. FIG. 2 is a schematic diagram of the structure of the apparatus, which including:

a candidate tag word determining module 201, configured to determine multiple candidate tag words corresponding to the document;

a co-occurrence probability determining module 202, configured to determine a corpus including multiple texts, select commonly-used words as characteristic words from the corpus, and determine, for each of the characteristic words and each of the candidate tag words, a probability for the co-occurrence of the candidate tag word with the characteristic word is determined in the corpus;

a weight calculating module 203, configured to abstract characteristic words from the document, and calculate a weight for each of the characteristic words;

a weighted co-occurrence probability calculating module 204, configured to calculate, in the corpus, a weighted probability for co-occurrence of each of the candidate tag words with all of the characteristic words occurring in the document; and a tag word adding module 205, configured to select a candidate tag word with a high weighted co-occurrence probability as a tag word to be added to the document.

In the apparatus described above, the co-occurrence probability may be denoted as P(X|Y), where X denotes one of the candidate tag words and Y denotes one of the characteristic words which occurs in the corpus. The co-occurrence probability determining module 202 may calculate P(X|Y) as follows.

P(X|Y) equals to a result of dividing the number of times for the co-occurrence of X and Y in the same text included in the corpus by the number of times for the occurrence of Y in the corpus.

Alternatively, $$P(X\mid Y) = \frac{H(X,Y)}{I(X,Y)},$$

where, H(X,Y) denotes a combination entropy of X and Y, I(X,Y) denotes mutual information of X and Y.

Alternatively, P(X|Y) is determined by using a lexical database.

In the apparatus described above, the weight for the characteristic word Y abstracted from the document is denoted as $W_Y$, which may be calculated by the weight calculating module 203 by: $W_Y$ is equal to the product of the number of times that Y occurs in the document and the number of the texts in the corpus in which Y occurs.

In the apparatus described above, the weighted co-occurrence probability may be denoted as $$P_X = \sum_{i=1}^{n} P(X\mid Y_i) \times W_{Y_i},$$

where $Y_i$, denotes one of the characteristic words abstracted from the document, $W_{Y_i}$ denotes the weight for $Y_i$, and n denotes the number of the characteristic words abstracted from the document.

In the apparatus described above, the weighted co-occurrence probability calculating module 204 may calculate the weighted co-occurrence probability only for the candidate tag word that co-occurs with more than one characteristic word abstracted from the document.

In conclusion, in the method and the apparatus for automatically adding a tag to a document according to the embodiments of the disclosure, a tag, not limited to a key word occurring in the document, may be added to a document intelligently by calculating the probability for co-occurrence of a characteristic word with a candidate tag word in the corpus, converting the co-occurrence probability into a vote from the characteristic word to the candidate tag word and taking the candidate tag word that obtains the most votes as the tag word to be added to the document. The relevance between the tag word and the document is enhanced based on the statistics on the co-occurrence probability according to the embodiments of the disclosure.

According to an embodiment of the disclosure, it is further provided a machine-readable storage medium for storing instructions which enables a machine to execute the method for automatically adding a tag to a document as described herein. It may be provided a system or an apparatus including a storage medium in which software program codes to implement the function of any of the embodiments described above are stored, and the computer (or CPU or MPU) in the system or the apparatus may read and execute the program codes stored in the storage medium.

In this case, the program codes read from storage medium may implement the function of any one of the embodiments described above. Therefore the program codes and the storage medium storing the program codes constitute a part of the disclosure.

Examples of the storage medium for providing the program codes include a soft disk, a hard disk, a magnetic optical disk, an optical disk (such as a CD–ROM, a CD–R, a CD–RW, a DVD–ROM, a DVD–RAM, a DVD–RW and a DVD+RW), a magnetic tape, a non-volatile memory and a ROM. Optionally, the program codes may be downloaded from a server computer via a communication network.

Moreover, it will be appreciated that the function of any one of the embodiments described above may be implemented via a few or all of the practical operations performed not only by executing the program codes read by the computer, but also by instructing the operation system operated on the computer based on the program codes.

Moreover, it should be understood that the function of any one of the embodiments described above may be implemented by writing the program codes read from the storage medium to a memory provided in an extension board inserted into the computer or writing the program codes to a memory provided in an extension unit connected to the computer and then instructing the CPU and the like mounted on the extension board or the extension unit based on the program codes to perform a few or all of the practical operations.

Preferable embodiments of the disclosure set forth above are not intended to limit the scope of the disclosure. Any changes, equivalences, improvements made within the spirit and principles of the disclosure fall in the scope of the disclosure.

The invention claimed is:

1. A method for automatically adding a tag to a document, comprising:
   determining, by an apparatus comprising a processor, a plurality of candidate tag words corresponding to the document;
   determining, by the apparatus, a corpus comprising a plurality of texts;
   selecting, by the apparatus, commonly-used words from the corpus as characteristic words;
   determining, by the apparatus, for each of the characteristic words and each of the candidate tag words, a probability for co-occurrence of the candidate tag word with the characteristic word;
   abstracting, by the apparatus, characteristic words from the document;
   calculating, by the apparatus, a weight for each of the abstracted characteristic words;
   calculating, by the apparatus, in the corpus, a weighted probability for co-occurrence of each of the candidate tag words with all of the characteristic words abstracted from the document; and
   selecting, by the apparatus, the candidate tag word with a high weighted co-occurrence probability as a tag word to be added to the document;
   wherein the weight for the characteristic word Y abstracted from the document is denoted as $W_y$, and $W_y$ is equal to a product of the number of times that Y occurs in the document and the number of the texts in the corpus in which Y occurs.

2. The method according to claim 1, wherein the co-occurrence probability is denoted as P(X|Y), wherein X denotes one of the candidate tag words and Y denotes one of the characteristic words which occurs in the corpus; and
   P(X|Y) is determined as a result of dividing the number of times for the co-occurrence of X and Y in a same text comprised in the corpus by the number of times for the occurrence of Y in the corpus.

3. The method according to claim 1, wherein the co-occurrence probability is denoted as P(X|Y), wherein X denotes one of the candidate tag words and Y denotes one of the characteristic words which occurs in the corpus; and
   P(X|Y) is determined as $$P(X \mid Y) = \frac{H(X, Y)}{I(X, Y)},$$

wherein H(X,Y) denotes a combination entropy of X and Y, I(X,Y) denotes mutual information of X and Y.

4. The method according to claim 1, wherein the co-occurrence probability is denoted as P(X|Y), wherein X denotes one of the candidate tag words and Y denotes one of the characteristic words which occurs in the corpus; and
   P(X|Y) is determined by using a lexical database.

5. The method according to claim 1, wherein the weighted co-occurrence probability is denoted as $$P_X = \sum_{i=1}^{n} P(X \mid Y_i) \times W_{Y_i},$$

wherein $Y_i$ denotes one of the characteristic words abstracted from the document, $W_{Y_i}$ denotes the weight for $Y_i$, and n denotes the number of the characteristic words abstracted from the document.

6. The method according to claim 1, wherein calculating, in the corpus, the weighted probability for co-occurrence of each of the candidate tag words with all of the characteristic words abstracted from the document comprises:
   calculating, in the corpus, the weighted probability for each of the candidate tag words that co-occur with more than one characteristic word abstracted from the document.

7. An apparatus for automatically adding a tag to a document, comprising:
   a candidate tag word determining module comprising a processor, configured to determine a plurality of candidate tag words corresponding to the document;
   a co-occurrence probability determining module comprising a processor, configured to determine a corpus comprising a plurality of texts, select commonly-used words from the corpus as characteristic words, and determine, for each of the characteristic words and each of the candidate tag words, a probability for co-occurrence of the candidate tag word with the characteristic word;
   a weight calculating module comprising a processor, configured to abstract characteristic words from the document, and calculate a weight for each of the abstracted characteristic words;
   a weighted co-occurrence probability calculating module comprising a processor, configured to calculate, in the corpus, a weighted probability for co-occurrence of each of the candidate tag words with all of the characteristic words abstracted from the document; and
   a tag word adding module comprising a processor, configured to select the candidate tag word with a high weighted co-occurrence probability as a tag word to be added to the document;
   wherein the weight for the characteristic word Y abstracted from the document is denoted as $W_y$, and the weight calculating module is configured to calculate $W_y$ as being equal to a product of the number of times that Y occurs in the document and the number of the texts in the corpus in which Y occurs.

8. The apparatus according to claim 7, wherein the co-occurrence probability is denoted as P(X|Y), wherein X denotes one of the candidate tag words and Y denotes one of the characteristic words which occurs in the corpus; and
   the co-occurrence probability determining module is configured to calculate P(X|Y) as a result of dividing the number of times for the co-occurrence of X and Y in a same text comprised in the corpus by the number of times for the occurrence of Y in the corpus.

9. The apparatus according to claim 8, wherein the weighted co-occurrence probability is denoted as $$P_X = \sum_{i=1}^{n} P(X \mid Y_i) \times W_{Y_i},$$

wherein $Y_i$ denotes one of the characteristic words abstracted from the document, $W_{Y_i}$ denotes the weight for $Y_i$, and n denotes the number of the characteristic words abstracted from the document.

10. The apparatus according to claim 8, wherein the weighted co-occurrence probability calculating module is configured to calculate, in the corpus, the weighted probability for each of the candidate tag words that co-occur with more than one characteristic word abstracted from the document.

11. The apparatus according to claim 7, wherein the co-occurrence probability is denoted as P(X|Y), wherein X denotes one of the candidate tag words and Y denotes one of the characteristic words which occurs in the corpus; and the co-occurrence probability determining module is configured to calculate P(X|Y) as $$P(X|Y) = \frac{H(X,Y)}{I(X,Y)},$$

wherein H(X,Y) denotes a combination entropy of X and Y, I(X,Y) denotes mutual information of X and Y.

12. The apparatus according to claim 11, wherein the weighted co-occurrence probability is denoted as $$P_X = \sum_{i=1}^{n} P(X|Y_i) \times W_{Y_i},$$

wherein $Y_i$ denotes one of the characteristic words abstracted from the document, $W_{Y_i}$ denotes the weight for $Y_i$, and n denotes the number of the characteristic words abstracted from the document.

13. The apparatus according to claim 11, wherein the weighted co-occurrence probability calculating module is configured to calculate, in the corpus, the weighted probability for each of the candidate tag words that co-occur with more than one characteristic word abstracted from the document.

14. The apparatus according to claim 7, wherein the co-occurrence probability is denoted as P(X|Y), wherein X denotes one of the candidate tag words and Y denotes one of the characteristic words which occurs in the corpus; and the co-occurrence probability determining module is configured to calculate P(X|Y) by using a lexical database.

15. The apparatus according to claim 7, wherein the weighted co-occurrence probability is denoted as $$P_X = \sum_{i=1}^{n} P(X|Y_i) \times W_{Y_i},$$

wherein $Y_i$ denotes one of the characteristic words abstracted from the document, $W_{Y_i}$ denotes the weight for $Y_i$, and n denotes the number of the characteristic words abstracted from the document.

16. The apparatus according to claim 7, wherein the weighted co-occurrence probability calculating module is configured to calculate, in the corpus, the weighted probability for each of the candidate tag words that co-occur with more than one characteristic word abstracted from the document.

17. A computer storage medium storing computer program codes for implementing a method for automatically adding a tag to a document, executable by a computer, wherein the computer program codes comprise:

instructions for determining a plurality of candidate tag words corresponding to the document;

instructions for determining a corpus comprising a plurality of texts;

instructions for selecting commonly-used words from the corpus as characteristic words;

instructions for determining, for each of the characteristic words and each of the candidate tag words, a probability for co-occurrence of the candidate tag word with the characteristic word; instructions for abstracting characteristic words from the document;

instructions for calculating a weight for each of the abstracted characteristic words;

instructions for calculating, in the corpus, a weighted probability for co-occurrence of each of the candidate tag words with all of the characteristic words abstracted from the document; and instructions for selecting the candidate tag word with a high weighted co-occurrence probability as a tag word to be added to the document;

wherein the weight for the characteristic word Y abstracted from the document is denoted as $W_y$, and a weight calculating module is configured to calculate $W_y$ as being equal to a product of the number of times that Y occurs in the document and the number of the texts in the corpus in which Y occurs.

18. The computer storage medium according to claim 17, wherein the co-occurrence probability is denoted as P(X|Y), wherein X denotes one of the candidate tag words and Y denotes one of the characteristic words which occurs in the corpus; and P(X|Y) is determined as a result of dividing the number of times for the co-occurrence of X and Y in a same text comprised in the corpus by the number of times for the occurrence of Y in the corpus.

* * * * *